LOW FRICTION DOCK BUMPER

Filed May 11, 1965 2 Sheets-Sheet 1

INVENTOR
RICHARD D. HEIN
BY Frank J. Earnheart
James A. Lucas
ATTORNEYS

LOW FRICTION DOCK BUMPER

Filed May 11, 1965 2 Sheets-Sheet 2

INVENTOR
RICHARD D. HEIN
BY Frank J. Eamheart
James A. Lucas
ATTORNEYS

United States Patent Office 3,335,689 Patented Aug. 15, 1967

3,335,689

LOW FRICTION DOCK BUMPER

Richard D. Hein, Wabash, Ind., assignor to The General Tire & Rubber Company, a corporation of Ohio Filed May 11, 1965, Ser. No. 454,892
12 Claims. (Cl. 114—219)

ABSTRACT OF THE DISCLOSURE

A generally rectangular dock bumper is provided with a scuff-resistant coating of cast polyurethane or other low-friction material mechanically attached or otherwise bonded to the crown thereof. The bumper contains a plurality of partially enclosed voids separated from one another by transversely extending energy absorbing webs.

This invention relates to a high capacity energy absorbing bumper. More specifically, this invention pertains to an elastomeric bumper adapted to protect docks and piers from the abrasion and impact of moving ships and vessels, said bumper provided with a low friction scuff resistant coating over the contacting surface thereof.

It has heretofore been a customary expedient to use wooden timbers to protect docks and piers from the impact caused by ships coming into contact therewith. However, the use of timbers suffers various shortcomings; namely, that the timbers themselves have very poor energy absorption characteristics and their use necessitates frequent maintenance and overhaul. Typically, the lifetime of wooden timbers, when subjected to the repeated impact and rubbing of vessels, is only about three or four months.

In an attempt to find a suitable replacement for wooden timbers, extruded hollow tubes of natural or synthetic rubber have been tried. These tubes are hung or placed on the sides of the piers, docks, or ships to serve as a cushion upon impact. These extruded tubes are much better than the wooden timbers from the standpoint of energy absorption, but they possess very poor frictional characteristics. Therefore, the abrasive forces caused by the relative rubbing movement between the ship, tubes and pier causes rapid deterioration of the tubes.

More recently, molded elastomeric dock bumpers have been used as replacements for extruded tubes. These molded bumpers are generally bonded to a suitable base plate which in turn is bolted or otherwise connected to the wharf or other structure to be protected. For the most part these bumpers have relatively high energy absorption characteristics, but they also suffer the same drawback as the tubes; that is, poor frictional properties. Consequently, these bumpers are often torn off of their base plate after a relatively short period of use.

One object of this invention is to provide a dock bumper which has high energy absorption characteristics and is highly scuff resistant.

Another object is the provision of a high energy elastomeric dock bumper having a coating of a highly abrasion-resistant material on its contact surface.

Still another object is to provide a dock bumper composed of an elastomeric body portion, means for attaching the bumper to a pier, wharf, or the like, and a highly abrasion-resistant elastomeric material bonded to the body portion coextensive with the area of contact with moving objects.

These and other objects will become apparent upon reading the foregoing discussion, particularly in light of the attached drawings in which.

Figure 4:
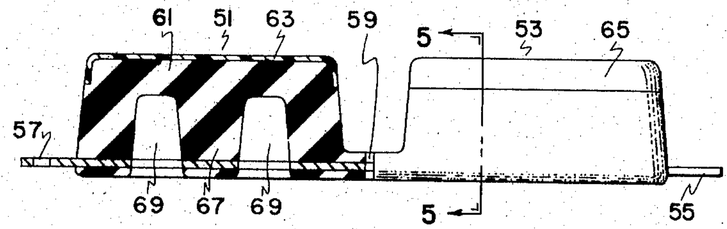
Figure 5:
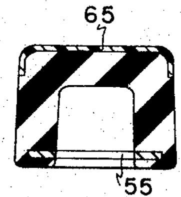
Figure 6:
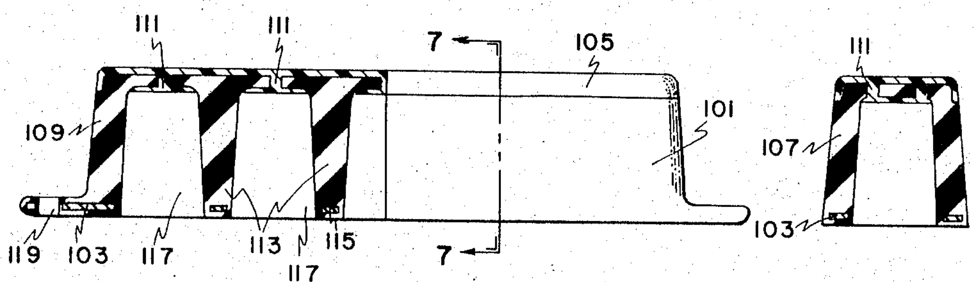
Figure 7:
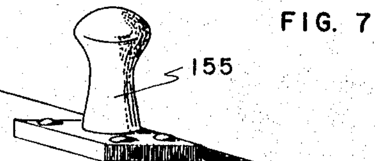

FIGURE 4 portrays one modification of the dock bumper and is a partially sectioned side view of the same;

FIGURE 5 is an end view taken along lines 5—5 of FIGURE 4;

FIGURE 6 depicts another embodiment of the invention, shown partially in cross section;

FIGURE 7 is a view taken along lines 7—7 of FIG URE 6; and

Figure 8:
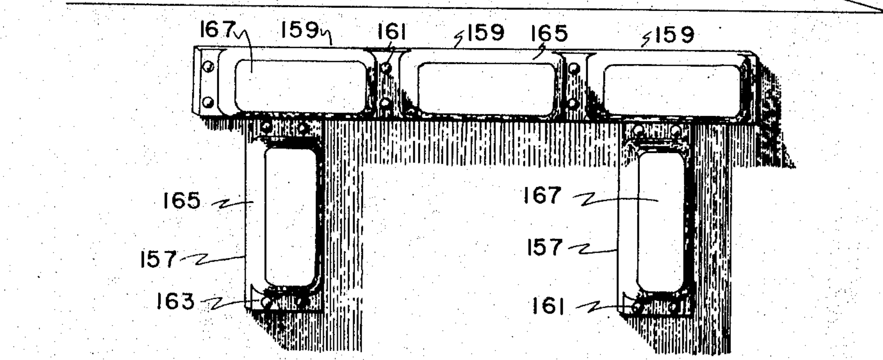

FIGURE 8 is a perspective view showing a typical installation of several bumpers on a wharf.

Figure 1:
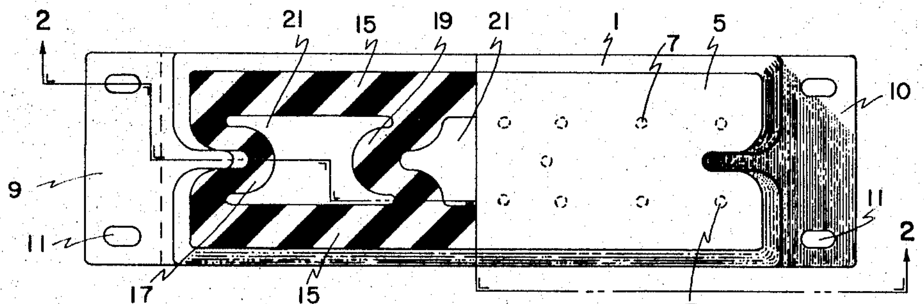
FIGURE 1 is a top view, sectioned along lines 1—1 of FIGURE 2, of one embodiment of the invention.
Figure 2:
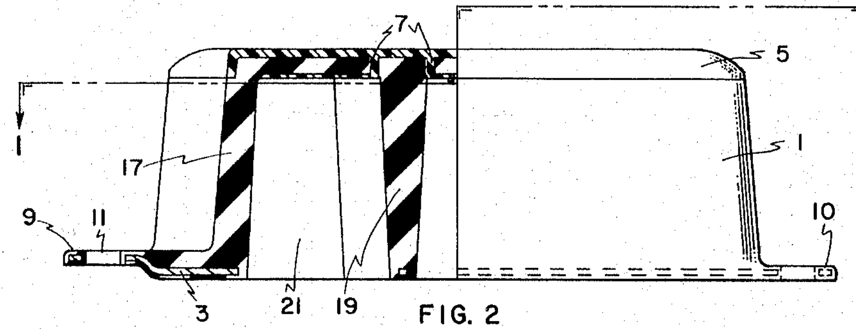
FIGURE 2 is a partially sectioned elevation taken along lines 2—2 of FIGURE 1.

Referring now to FIGURES 1 and 2, there is shown a dock bumper representing a preferred embodiment of the invention. This bumper consists of three principal parts; a body 1 of a suitable elastomeric material, a rigid fastening plate 3 embedded within the body, and a scuff resistant cap 5 covering the crown of the bumper. The body of the bumper is essentially rectangular in shape, tapering slightly inwardly from the base toward the crown. It comprises two substantially parallel side portions 15, two curved end portions 17, and at least one, but preferably two or more, transversely extending internal webs 19 intermediate said ends. These webs, of generally arcuate shape, extend from the base plate 3 up to the crown of the bumper. The curved ends 17 and webs 19 define a series of cavities 21, each of which is enclosed at one end by the crown; and is open at the other through an opening in plate 3 corresponding in shape to the horizontal cross section of the cavity.

A plurality of holes 7 are drilled, molded or otherwise provided in the crown of the bumper to which a scuff-resistant cap is mechanically bonded. This is accomplished by, for example, molding the cap directly onto the body, the holes serving to anchor the cap in place.

The rigid fastening plate 3 is approximately the same width as the elastomeric body 1, and is slightly longer than the body, thereby forming flanges 9, 10. These flanges are provided with slots 11 or other means for the purpose of mounting the bumper to the structure to be protected. Although two slots are shown in each flange, it is to be understood that the number of slots, their spacing and size, are illustrative only. To facilitate the mounting, where a number of bumpers are to be installed on a wharf or the like, flange 9 is raised above the plane of flange 10 by an amount corresponding generally to the thickness of the flange. This permits the flanges of adjacent bumpers to be overlapped, and attached to the wharf using a common bolt.

When the dock bumper is subjected to a large force applied generally vertically to the bumper, i.e. normal to the base thereof, this force is initially resisted by the vertical columns formed by the sides 15, ends 17, and internal webs 19. Because of the relatively incompressible nature of the rubber in these columns, very little deflection occurs during the initial application of the load. However, as the load is increased, a critical point is reached at which buckling takes place. Thereafter, a slight increase in load causes the sides, ends, and webs to collapse. After buckling occurs, a further increase in load deforms the bumper only to the extent that the rubber in the collapsed walls and webs is compressed between the dock and the berthing vessel.

Figure 3:
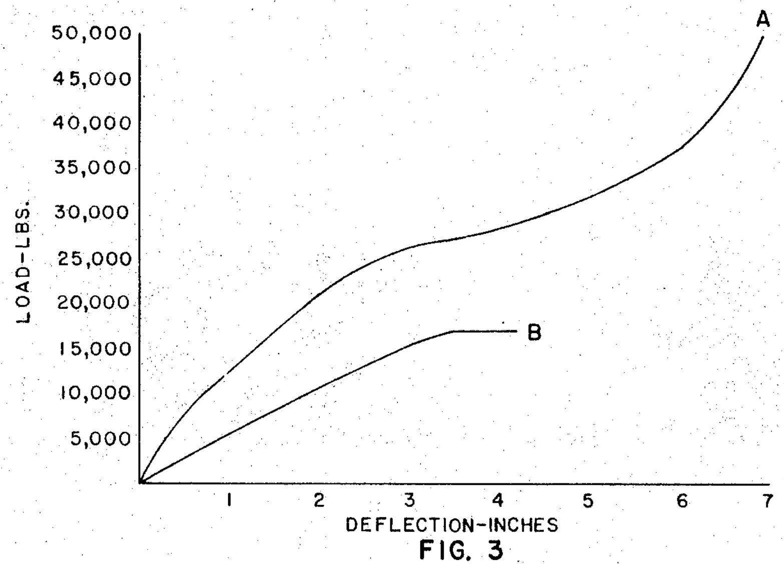
FIGURE 3 shows actual load-deflection curves for a dock bumper of the type shown in FIGURES 1 and 2.

FIGURE 3 shows a load deflection curve for a bumper of the type shown in FIGURES 1 and 2 in which the dimensions of the body are approximately one foot by theree feet, and the over-all height is 13½ inches. The internal webs had a minimum thickness of 1½ inches, and the maximum thickness of the sides and ends of the body are about three inches. The body was fabricated from butyl rubber and has a hardness of approximately 55 durometer. The low friction scuff coat is approximately 1¾ inches thick and is composed of cast urethane mechanically locked in place. Curve A shows the deflection caused by a load applied to the crown at right angles thereto. The general shape of the curve indicates that the load initially builds up fairly rapidly to about 25,000 pounds with relatively little deflection of the bumper. Thereafter, the walls of the bumper begin to collapse, this occurring with little additional increase in load as represented by the relatively horizontal portion of the curve. The curve again turns upward to indicate that the sides, webs, and ends of the bumper have collapsed and that further deflection is due to compressive deformation of the rubber.

Curve B represents the results when a test load is applied to the bumper shown in FIGURES 1 and 2 at an angle of 20° from the vertical, the load rate, and other conditions remaining the same as in the first test. The significant aspect of this curve is that when the load exceeds about 17,000 pounds, the low frictional coefficient of the scuff-resistant cap causes slipping to occur, this causing the load to glance off. The same type of load applied to prior fendering devices would generally cause a severe abrasive deterioration of the devices, possibly tearing them from their mountings.

Referring now to FIGURES 4 and 5, there is shown one embodiment of this invention wherein the dock bumper consists of two units 51 and 53 fastened to a common base plate 55 which plate is provided with holes 57 at either end and one or more holes 59 intermediate said two units for attaching the bumper to a pier or the like. The unit 51 has a body portion 61 fabricated out of a suitable elastomer and having a crown protected by a low friction material 63 attached thereto. In like manner, unit 53 has a layer of a low friction material 65 covering the crown portion thereof, each of these layers being attached to the respective body portions by use of a suitable adhesive or the like.

The body of each unit is generally rectangular, and is tapered slightly inwardly from the base to the crown. Each body contains two hollow cavities 69 separated from one another by a reinforcing web 67. The base plate 55 is perforated or cut to provide holes therein corresponding in size and shape with said hollow cavities. These cavities communicate with the pier or structure to which the bumper is attached, but are otherwise totally enclosed.

It is readily apparent that the concept shown in FIGURES 4 and 5 is not limited to two units attached or bonded to a singular plate, but can include any number of units, so long as they are provided with a crown or contact area of low friction material.

In FIGURES 6 and 7 there is shown another modification of a dock bumper of the type shown in FIGURES 1 and 2, the principal departure being that the reinforcing webs are straight rather than arcuate. The bumper consists of an elastomeric body portion 101 made from a rubber-like material such as butyl rubber, natural rubber, or the like, a base plate 103 bonded to the body and adapted to be attached to a pier or other suitable structure by bolts or the like passing through slots 119, and a low friction material mechanically joined to the crown portion of the body to form a cap 105. The sides 107 and ends 109 of the body portion have a slight taper extending from the base plate 103 to the crown, this taper provided primarily to assist in molding the elastomeric body. A plurality of holes 111 are provided in the crown portion of the body, and the low friction cap 105 is attached thereto by, for instance, inverting the body in a mold having the desired contour, pouring a liquid polymer such as urethane into the mold to a sufficient depth so that it fills the mold and rises through the holes to completely cover the underside of the crown. Upon hardening of the polymer, it is mechanically locked in place. A plurality of straight, tapered reinforcing webs 113 extending across the width of the bumper divide the hollow interior of the body into a series of generally rectangular inverted cup-shaped voids 117. The fastening plate 103 is provided with a plurality of rectangular holes corresponding in size and location to the opening of these voids 117. These rectangular holes are separated from one another by ribs 115 which are embedded in the elastomeric webs 113.

Referring now to FIGURE 8, there is shown in perspective a typical wharf 151 on suitable piles 153 extending into a body of water. Securely attached to the top of the wharf is a rugged hitch 155 of well-known construction to which ships are secured when docked. The side of the warf is protected against the impact of berthing ships and the constant rubbing of vessels moored at the wharf by a plurality of bumpers of the type disclosed by this invention. Two of these bumpers 157 are arranged with their major dimension in a vertical direction and three of the bumpers 159 are horizontally disposed. These horizontal units can be separate and distinct, such as the type shown in FIGURES 1 and 6, or they can all share a common base plate such as shown in FIGURE 4.

The bumpers are attached by a plurality of bolts 161 passing through slots in the base plates 163.

Each bumper is composed of an elastomeric body 165 having cavities therein, said body bonded to a base plate 163 and having a layer of low friction material 167 covering the crown area thereof. Because of this low friction surface, a large ship striking the bumpers at an angle of less than 90° deforms the bumpers up to a certain limit after which slipping will occur between the ship and the low friction surface, thereby protecting the bumper against torn away from its base plate.

Furthermore, the construction of the bumper with its arrangement of reinforcing webs generally normal to the direction of force enables the bumper to absorb large amounts of energy during compressive deformation of the same, thereby minimizing the likelihood of damage occurring to the wharf itself.

It should be understood that there are many alternative designs and shapes that can be utilized in the production of a dock bumper which nevertheless will come within the scope of the appended claims. For example, the webs and voids within the body, including their number, size, and shape, may be varied from the arrangements shown in the drawings. Likewise, the means of fastening the bumper to the object to be protected can be varied.

The body portion of the impact-absorbing device can be molded or otherwise fabricated from a variety of elastomeric materials including butyl, neoprene, and natural rubber. Factors such as cost, ease of molding, resistance to deterioration when subjected to repeated use, load-deflection properties, weathering properties, just to name a few, must be considered when selecting a suitable elastomer. Furthermore, in producing an impact absorber of the type herein described compression molding, injection molding, or other approaches known to the skilled artisan can be used. One preferred method of fabricating, however, consists of placing a suitable uncured natural or synthetic rubber-containing composition into a mold along with a base plate, preferably a metal plate, and molding and curing the two into a unitary structure. During the curing operation, the metal plate becomes securely bonded to the elastomeric stock. If it is contemplated that the scuff-resistant coating is to be mechanically fastened to the crown area of the bumper, suitable inserts are provided in the mold to form the holes shown, for instance in FIGURES 1 and 6, in the crown of the bumper.

In one suggested method of providing the scuff-resistant cap, urethane is mechanically bonded to the body portion by inverting the cured body-plate assembly in a suitable mold and pouring liquid urethane into the mold to a sufficient depth to form a cap and to extend through the holes in the crown part way into the void spaces molded into the body. Upon becoming hard, the cap is securely anchored to the elastomer and to itself. Another method of mechanically attaching the cap involves the use of bolts, clips, or other fastening devices.

It should be noted that urethane is not the only low friction material which can be used as a scuff-resistant cap in the contact area of the bumper. Additional scuff-resistant materials such as Adiprene, nylon, and Teflon can likewise be used. In fact, any material which has high abrasion resistance and/or low frictional characteristics and which can be easily anchored to the crown of the bumper can be used. Furthermore, it should be understood that this scuff coat can be bonded chemically to the body portion of the bumper, even though mechanical bonding is to be preferred. In addition, the low friction covering need not be limited to the crown area only, but instead can cover a substantial portion of the bumper.

This bumper is not limited in use to marine applications such as docks, piers, berthing, etc. It may likewise be used on loading docks, trucks, and other applications where it is desired to provide a high energy absorption, high friction resistant, protective device.

Having thus described my invention, said description being for the purpose of clarification and not for limitation, I claim:

1. A generally longitudinally extending dock bumper comprising:

(A) A rigid substantially flat base plate adapted to be attached to the dock and having a plurality of longitudinally spaced apart voids therein;

(B) A molded rubber body to which said base plate is bonded and containing a plurality of cavities, each communicatng with one of the voids in said plate, the cavities being defined by the sides of the body, spaced-apart ribs extending in a direction substantially normal to said base plate and to said sides of said body, and a crown opposite said base plate;

(C) A substantially flat cap composed of a scuff-resistant rigid elastomeric material mechanically bonded to said body covering said crown.

2. A bumper according to claim 1 wherein the scuff-resistant cap is made from polyurethane.

3. A bumper according to claim 1 wherein the rubber body is provided with at least one hole extending through the crown of each cavity, and through which the scuff-resistant cap is attached to said body.

4. A dock bumper comprising:

(A) A generally rectangular hollow elastomeric body having (1) A base and a crown opposite said base, (2) Two relatively parallel sides extending between the base and the crown, (3) A plurality of longitudinally spaced-apart webs extending between the sides from the base to the crown dividing the body into a plurality of separate cavities substantially enclosed at the crown and open at the base, the two outermost webs defining the ends of the body, (B) A rigid flat plate associated with said base for attaching the bumper to a structure to be protected, said plate having voids corresponding in location and shape to said cavities, (C) A low friction cap coextensive with, and attached to, said crown.

5. A bumper according to claim 4 wherein said rigid plate is embedded in the base of the elastomeric body.

6. A bumper according to claim 5 wherein said low friction cap is mechanically connected to said crown.

7. A bumper according to claim 6 wherein said low friction cap extends through holes in the crown of the body and into the cavities.

8. A bumper according to claim 6 wherein said cap is composed of polyurethane.

9. A bumper according to claim 4 wherein the webs are transversely arcuate.

10. A bumper according to claim 4 wherein the webs are substantially planar.

11. The bumper according to claim 4 wherein the body is composed of a plurality of longitudinally spaced-apart units.

12. The bumper according to claim 9 wherein a low friction cap is adhesively bonded to each of said units.

References Cited

UNITED STATES PATENTS

| | | | |
|---|---|---|---|
| 2,578,291 | 12/1951 | Dickson | 114—219 |
| 2,685,269 | 8/1954 | Manson | 114—219 |
| 2,935,855 | 5/1960 | Reid | 114—219 X |
| 3,093,367 | 6/1963 | Hawkins et al. | 267—1 |

MILTON BUCHLER, *Primary Examiner.*

B. BELKIN, *Assistant Examiner.*